United States Patent [19]

Edelman et al.

[11] 4,219,527

[45] Aug. 26, 1980

[54] EXTRUSION GRADE POLYETHYLENE TEREPHTHALATE

[75] Inventors: Robert Edelman, Staten Island, N.Y.; Frank M. Berardinelli, Millington; Kurt F. Wissbrun, Short Hills, both of N.J.

[73] Assignee: Celanese Corporation, New York, N.Y.

[21] Appl. No.: 956,532

[22] Filed: Oct. 31, 1978

Related U.S. Application Data

[62] Division of Ser. No. 894,674, Apr. 10, 1978.

[51] Int. Cl.² ............................................ B29C 17/07
[52] U.S. Cl. .................................. 264/540; 264/541; 264/542; 264/543; 428/35
[58] Field of Search ............................... 264/540–543; 428/35

[56] References Cited

U.S. PATENT DOCUMENTS

| | | | |
|---|---|---|---|
| 2,951,827 | 9/1960 | Siggel | 528/281 |
| 3,033,824 | 5/1962 | Huffman | 528/295 |
| 3,673,139 | 6/1972 | Hrach | 260/22 R |
| 3,692,744 | 9/1972 | Rich | 528/296 |
| 3,733,309 | 5/1973 | Wyeth et al. | 264/540 X |
| 3,803,275 | 4/1974 | Corsover | 264/540 X |

*Primary Examiner*—Lucille M. Phynes
*Attorney, Agent, or Firm*—Kenneth A. Genoni

[57] ABSTRACT

A process is disclosed for modifying polyethylene terephthalate so that the polyethylene terephthalate may be processed into plastic containers using conventional extrusion blow molding equipment. The polyethylene terephthalate is modified by the incorporation into a polyethylene terephthalate prepolymer of a chain branching agent and a chain terminating agent. The prepolymer is subsequently solid-state polymerized to form a polyethylene terephthalate polymer having high zero shear rate melt viscosity and shear sensitivity. This modified polyethylene terephthalate polymer may be extrusion blow molded in intermittent and continuous processes.

3 Claims, No Drawings

EXTRUSION GRADE POLYETHYLENE TEREPHTHALATE

This is a division of application Ser. No. 894,674, filed Apr. 10, 1978.

BACKGROUND OF THE INVENTION

Containers used in the cosmetics, food and drug industries have in the past generally been constructed of glass or certain plastic resins, e.g., polyvinyl chloride, polypropylene, polycarbonate or polyacrylonitrile resins. In many instances, these containers have proven to be unsatisfactory or undesirable from the standpoint of cost or biodegradability or for various other reasons. For example, it has been discovered that containers, e.g., bottles, constructed of polyacrylonitrile resin give off noxious fumes when incinerated, causing severe environmental pollution problems. Recently, the use of polyacrylonitrile resin in such bottle construction has been stopped completely. Other containers, such as glass, have obvious drawbacks, being readily breakable, bulky to transport and expensive to manufacture, requiring excessive energy consumption.

One material which has been investigated as a possible source of improved construction material for containers in the cosmetics, food and drug industries has been polyethylene terephthalate (PET). However, because of the fluid melt characteristics of PET, new, expensive and specialized equipment has had to be developed to process PET into containers and bottles. This equipment is generally based on processes which involve injection molding of a cylindrical or tubular preform which is subsequently reheated and simultaneously stretched and blown in another machine to form a container or bottle. See, e.g., U.S. Pat. No. 3,778,214.

Attempts to modify PET for use in injection molding processes include, e.g., U.S. Pat. Nos. 3,692,744 and 3,673,139. These patents deal with the incorporation of a chain branching agent, alone or in combination with a crystallization-promoting agent into PET in an effort to produce a composition which may be injection molded. The drawbacks of such injection molding processes have been already pointed out. While the latter of these patents suggests that PET modified with a chain branching agent and a crystallization promoting agent may be suitable for extrusion molding applications, such suitability is expressly limited to the production of semifinal goods such as rods, sheets and embossed sheets. The process is not disclosed as applicable to extrusion blow molding of a parison to form hollow structures such as containers or bottles. In fact, it had not been possible until the present invention to successfully mold containers and bottles of PET which would serve as acceptable cosmetics, food or drug containers by the use of conventional extrusion blow molding equipment common in these industries.

In the past, in other areas of application unrelated to the extrusion blow molding of containers and bottles, attempts have been made to modify various polyesters, some including PET, by the incorporation of a chain branching agent or a chain terminating agent or both.

The attempts have been concerned with rendering polyesters suitable for use, e.g., as electrical or thermal insulating materials, coating compositions, or fiber and filament-forming materials with increased dye receptivity. Representative examples of such attempts include U.S. Pat. Nos. 2,606,161; 2,936,296; 2,951,827; 3,033,824; 3,039,979; 3,055,867; 3,223,666; and 3,546,180.

It was not until the present invention, however, in the course of a continuing search for acceptable alternatives to conventional bottle construction materials, that it was discovered that a high melt-strength, gel-free polyethylene terephthalate suitable for use in conventional extrusion blow molding applications could be obtained by the incorporation of specific amounts of selected chain branching and chain terminating agents in combination.

OBJECTS AND SUMMARY OF THE INVENTION

Accordingly, a general object of the present invention is to avoid or substantially alleviate the above problems of the prior art.

A more specific object of the present invention is to provide a process for preparing improved polyethylene terephthalate compositions of increased shear sensitivity.

Another object of the present invention is to provide a process for preparing improved polyethylene terephthalate compositions useful in extrusion blow molding applications.

A further object of the present invention is to provide a process for preparing improved polyethylene terephthalate compositions suitable for fabrication into shaped articles by techniques requiring self-supporting, high melt-strength extrudates.

A further object of the present invention is to provide a process for preparing improved polyethylene terephthalate compositions which contain substantially no gels.

Still another object of the present invention is to provide the improved polyethylene terephthalate compositions prepared by these processes.

Yet another object of the present invention is to provide improved processes for extrusion blow molding of containers utilizing these improved polyethylene terephthalate compositions.

Other objects and advantages of this invention will become apparent from the following summary and description of the preferred embodiments set out below.

In one aspect, the present invention provides a high melt-strength, gel-free, branched polyethylene terephthalate polymer, suitable for extrusion blow molding applications. This polymer comprises polyethylene terephthalate which has been modified by the incorporation of from about 0.025 to about 1.5 mol percent of a chain branching agent and from about 0.25 to about 10 equivalents based on the number of moles of chain branching agent of a chain terminating agent. The chain branching agent may be one or more members selected from the group consisting of pentaerythritol; compounds having the formula:

wherein $R^1$ is a saturated aliphatic hydrocarbon radical containing from 3 to 6 carbon atoms and k is an integer from 3 to 6; compounds having the formula:

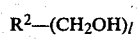

wherein $R^2$ is a saturated aliphatic hydrocarbon radical containing from 1 to 6 carbon atoms and wherein l is an integer from 3 to 6; compounds having the formula:

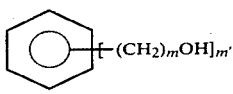

wherein m is an integer from 1 to 6 and m' is an integer from 3 to 6; and compounds having the formula:

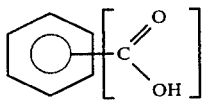

wherein n is an integer from 3 to 4.

The chain terminating agent has a boiling point of above about 200° C., is stable at temperatures of up to about 305° C. and is selected from one or more members of the group consisting of aromatic monocarboxylic acids having the formula:

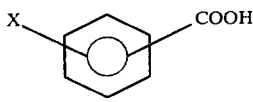

wherein X is a member selected from the group consisting of hydrogen, an aliphatic radical containing from 1 to 10 carbon atoms, an alkoxy group containing from 1 to 10 carbon atoms, an aryloxy group containing from 1 to 10 carbon atoms, a halogen, and a nitro group; heterocyclic aromatic monocarboxylic acids; fused polycyclic aromatic monocarboxylic acids; aryl aliphatic monocarboxylic acids having the formula:

$(C_6H_5)_p CH_{3-p} COOH$ where p is an integer from 1 to 3; substituted and unsubstituted, saturated and unsaturated aliphatic monocarboxylic acids having from 6 to 30 carbon atoms; substituted and unsubstituted alicyclic carboxylic acids having from 6 to 30 carbon atoms; monofunctional esters having the formula:

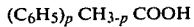

wherein $R^3$ is an organic radical derived from a member selected from the group consisting of aromatic monocarboxylic acids having the formula:

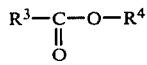

wherein Y is a member selected from the group consisting of hydrogen, an aliphatic radical containing from 1 to 10 carbon atoms, an alkoxy group containing from 1 to 10 carbon atoms, an aryloxy group containing from 1 to 10 carbon atoms, a halogen, and a nitro group; heterocyclic aromatic monocarboxylic acids; fused polycyclic aromatic monocarboxylic acids; aryl aliphatic monocarboxylic acids having the formula:

$(C_6H_5)_q CH_{3-q} COOH$ where q is an integer from 1 to 3; substituted and unsubstituted, saturated and unsaturated aliphatic monocarboxylic acids having from 6 to 30 carbon atoms; and substituted and unsubstituted alicyclic carboxylic acids having from 6 to 30 carbon atoms; and wherein $R^4$ is a member selected from the group consisting of benzyl radicals and aliphatic radicals having from 1 to 18 carbon atoms; and which are the reaction product of an alcohol and a monocarboxylic acid; and difunctional esters having the formula:

wherein $R^5$ is an organic radical derived from a member selected from the group consisting of aromatic monocarboxylic acids having the formula:

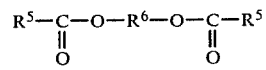

wherein Z is a member selected from the group consisting of hydrogen, an aliphatic radical containing from 1 to 10 carbon atoms, an alkoxy group containing from 1 to 10 carbon atoms, an aryloxy group containing from 1 to 10 carbon atoms, a halogen, and a nitro group; heterocyclic aromatic monocarboxylic acids; fused polycyclic aromatic monocarboxylic acids; aryl aliphatic monocarboxylic acids having the formula:

$(C_6H_5)_4 CH_{3-r} COOH$ where r is an integer from 1 to 3; substituted and unsubstituted, saturated and unsaturated aliphatic monocarboxylic acids having from 1 to 30 carbon atoms; and substituted and unsubstituted alicyclic carboxylic acids having from 6 to 30 carbon atoms; and wherein $R^6$ is a member selected from the group consisting of saturated aliphatic radicals having from 2 to 18 carbon atoms and saturated alicyclic radicals having from 5 to 18 carbon atoms; and which are the reaction product of a diol and a monocarboxylic acid. The modified polyethylene terephthalate has a zero shear rate melt viscosity at a temperature in the range of from about 265° C. to about 300° C. of from about $10^5$ to about $10^6$ poise and a melt viscosity at a shear rate of about $10^3$ seconds $^{-1}$ and at a temperature of from about 265° C. to about 300° C. of from about $10^3$ to about $10^4$ poise.

In another aspect, the present invention provides a high melt-strength, gel-free, branched polyethylene terephthalate polymer, suitable for extrusion blow molding applications, which polymer has been modified by the incorporation of from about 0.025 to about 1.5 mol percent of a single composition which acts as both a chain branching agent and a chain terminating agent. This composition is a polyfunctional ester having a boiling point of above about 200° C. and being stable at temperatures of up to about 305° C. and having the formula:

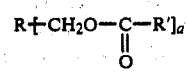

wherein a is an integer from 3 to 6; and which is derived by the reaction of a chain branching agent selected from the group consisting of pentaerythritol; compounds having the formula:

wherein R is a saturated aliphatic hydrocarbon radical containing from 3 to 6 carbon atoms and k is an integer from 3 to 6; compounds having the formula:

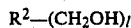

wherein $R^2$ is a saturated aliphatic hydrocarbon radical containing from 1 to 6 carbon atoms and wherein l is an integer from 3 to 6; and compounds having the formula:

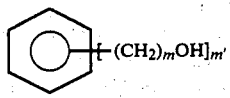

wherein m is an integer from 1 to 6 and m' is an integer from 3 to 6 with a chain terminating agent selected from one or more members of the group consisting of aromatic monocarboxylic acids having the formula:

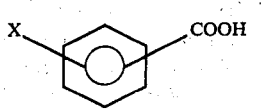

wherein X is a member selected from the group consisting of hydrogen, an aliphatic radical containing from 1 to 10 carbon atoms, an alkoxy group containing from 1 to 10 carbon atoms, an aryloxy group containing from 1 to 10 carbon atoms, a halogen, and a nitro group; heterocyclic aromatic monocarboxylic acids; fused polycyclic aromatic monocarboxylic acids; aryl aliphatic monocarboxylic acids having the formula:

where p is an integer from 1 to 3; substituted and unsubstituted, saturated and unsaturated aliphatic monocarboxylic acids having from 1 to 30 carbon atoms; and substituted and unsubstituted alicyclic carboxylic acids having from 6 to 30 carbon atoms.

In this aspect of the invention, the modified polyethylene terephthalate also has a zero shear rate melt viscosity at a temperature in the range of about 265° C. to about 300° C. of from about $10^5$ to about $10^6$ poise and a melt viscosity at a shear rate of about $10^3$ seconds$^{-1}$ and at a temperature in the range of about 265° C. to about 300° C. of from about $10^3$ to about $10^4$ poise.

In another aspect, the present invention provides for a process of preparing a high melt-strength, gel-free, branched polyethylene terephthalate polymer, suitable for extrusion blow molding applications, by first forming a polyethylene terephthalate prepolymer which has been modified by the incorporation of from about 0.025 to about 1.5 mol percent of one or more chain branching agents as described above in connection with the first-mentioned aspect of the present invention and from about 0.25 to about 10 equivalents based on the number of moles of chain branching agent of a chain terminating agent, also as described above in connection with the first-mentioned aspect of the present invention.

The prepolymer which is formed has an inherent viscosity of from about 0.3 to about 1.0 and is subsequently solid-state polymerized to form a polyethylene terephthalate polymer having a zero shear rate melt viscosity at a temperature in the range of from about 265° C. to about 300° C. of from about $10^5$ to about $10^6$ poise and a melt viscosity at a shear rate of about $10^3$ seconds $^{-1}$ and at a temperature in the range of from about 265° C. to about 300° C. of from about $10^3$ to about $10^4$ poise and an inherent viscosity greater than the inherent viscosity of the prepolymer.

In yet another aspect, the present invention provides for a process of preparing a high melt-strength, gel-free, branched polyethylene terephthalate polymer, suitable for extrusion blow molding applications, by first forming a polyethylene terephthalate prepolymer which has been modified by the incorporation of from about 0.025 to about 1.5 mol percent of a single composition which acts as both a chain branching agent and a chain terminating agent. This composition is the polyfunctional ester which is described above in connection with the second-mentioned aspect of the present invention. The prepolymer which is formed has an inherent viscosity of from about 0.3 to about 1.0 and is subsequently solid-state polymerized to form a polyethylene terephthalate polymer having a zero shear rate melt viscosity at a temperature in the range of from about 265° C. to 300° C. of from about $10^5$ to about $10^6$ poise, a melt viscosity at a shear rate of about $10^3$ seconds $^{-1}$ and at a temperature in the range of from about 265° C. to about 300° C. of from about $10^3$ to about $10^4$ poise and an inherent viscosity greater than the inherent viscosity of the prepolymer.

In a further aspect, the present invention provides a process for blow molding a modified polyethylene terephthalate polymer into containers on an extrusion blow molding machine. The maching comprises an extruder having a die gap at one end thereof and an operable mold positioned adjacent the die gap. The polymer is extruded through the die gap to form a parison, and a mold is closed about the parison. Gas is introduced into the parison to expand it into the shape of the internal surface of the mold. The polymer has a zero shear rate melt viscosity at a temperature of from about 265° C. to about 300° C. of from about $10^5$ to about $10^6$ poise, a melt viscosity at a shear rate of about $10^3$ seconds $^{-1}$ and at a temperature in the range of from about 265° C. to about 300° C. of from about $10^3$ to about $10^4$ poise and an inherent viscosity greater than the inherent viscosity of the prepolymer.

DESCRIPTION OF THE PREFERRED EMBODIMENTS

As indicated above, the present invention is concerned with the formation and use of a modified polyethylene terephthalate polymer suitable for extrusion blow molding applications.

To perform a successful extrusion blow molding operation with PET, the molten PET must form into a stable parison for a time long enough to permit a mold to enclose the parison. If the molten PET does not possess this sufficient "melt strength" or melt viscosity, the parison will tend to elongate or draw under its own weight and either not be blow moldable or result in a blow molded article which has a non-uniform wall thickness, low surface gloss, poorly defined sample shape, and a large number of pitmarks.

Melt strength (MS) may be defined as follows:

$$MS = (I_1/I_2)$$

wherein $T_1$ equals the time necessary to extrude the first three inches of a six-inch continuous strand of molten polyester, and $T_2$ equals the time necessary to extrude the second three inches of the six-inch continuous strand. Melt strength may be measured by extruding the six inch strand through a constant drive melt index apparatus with a constant drive piston (0.25 inches/minute) at a temperature high enough to keep the polyester molten (generally about 285° C.). A melt strength value of from about 1.0 to about 2.0 is desirable when the material is to be used in extrusion blow molding applications. Ideally, a value of 1.0 is desired since this would mean that the second three-inch portion extruded at the same rate as the first.

For polyesters with poor or low melt strength, the second segment is extruded much more rapidly than the first segment, resulting in a $T_1/T_2$ ratio significantly greater than 1.0.

Thus, polyesters having poor or very low melt strengths have rather large values of $T_1/T_2$. By saying that certain polyesters have "no melt strength" is meant that the second segment of the six-inch strand is extruded so rapidly that $T_2$ cannot be measured.

The term "high melt strength" polyesters refers to polyesters having a ratio of $T_1/T_2$ approaching the ideal value of 1.0, and the terms "poor" or "low melt strength" polyester refer to polyesters having comparatively large $T_1/T_2$ ratios. Polyesters having "no melt strength" have so small a $T_2$ value that the melt strength cannot be measured.

The term "polyester" as used herein is any high molecular weight synthetic polymer composed of at least 85% by weight of an ester of a dihydric alcohol and terephthalic acid (p—HOOC—$C_6H_4$—COOH).

The term "parison" as used herein refers to a molten, extruded preform, generally in tubular or similar form.

The improved polyethylene terephthalate polymers have melt strengths of generally less than about 2.0, typically less than about 1.5 and preferably less than about 1.2 at 285° C.

The improved melt strength polyesters of the present invention also have increased inherent viscosities. The "inherent viscosity" (I.V.) of the polyethylene terephthalate polymers of the present invention may be conveniently determined by the equation $$I.V. = \frac{\ln N_r}{c}$$

wherein $N_r$ is the "relative viscosity" obtained by dividing the viscosity of a dilute solution of the polyester by the viscosity of the solvent employed (measured at the same temperature), and c is the polymer concentration in the solution, expressed in grams/100 ml of solvent. Improved polyester inherent viscosity is generally determined in a 0.2 weight percent solution of trifluoroacetic acid/methylene chloride (1:1 v/v). Where solubility of samples is a problem, inherent viscosity of samples is determined in a 0.2 weight percent solution of hexafluoroisopropanol (HFIP). Determinations are made at a temperature of about 25° C. The inherent viscosity of the improved polyesters of the present invention is above about 1.0 and preferably from about 1.4 to about 1.6 in a 0.2 weight percent solution of trifluoroacetic acid/methylene chloride (1:1 v/v).

Inherent viscosities for prepolymer solutions are measured in an I.V. solution of 0.2 weight percent orthochlorophenol at about 120° C. or in an equal volume mixture of trifluoroacetic acid and methylene chloride at about 25° C., and preferably range from about 0.3 to about 1.0.

Besides having sufficient melt viscosity or "melt strength", PET to be successfully used in extrusion blow molding applications should also possess sufficient die swell, i.e., the molten PET should expand as it is released from the die. This die swell is important for extrusion blow molding applications since (a) the larger the diameter of the extruded PET, the easier it is for air to be blown into the parison, and (b) the greater the die swell the greater the expansion of the molten PET to fit the particular mold.

The key to this invention is the preparation of a modified PET having a sufficient shear sensitivity to render the PET acceptable for use in blow molding operations. Shear sensitivity is a measure of the change in viscosity of PET as a function of shear rate. At zero shear rate or at a shear rate which is sufficiently low such that viscosity is independent of shear rate, viscosities generally in the range of about $10^5$ to about $10^6$ poise are considered acceptable for extrusion blow molding applications. To enable the PET to move through an extrusion die at reasonable temperatures and pressures and to allow the extruded parison to hang prior to blowing without deformation under its own weight, the melt viscosity must be shear rate dependent. That is, as the shear rate is increased from zero, the melt viscosity should correspondingly decrease, e.g., the viscosity should be generally in the range of about $10^3$ to about $10^4$ poise at a shear rate of about $10^3$ seconds $^{-1}$, so that the resin will readily flow through the extrusion head. When application of shear stress is again lowered or ceases, the melt viscosity should again rise to its initial level.

Shear rates are measured at a temperature in the range of from about 265° C. to about 300° C.

Linear PET has a relatively low molecular weight and a narrow molecular weight distribution. This combination of characteristics results in a low melt strength polymer having a low shear sensitivity which is unacceptable for extrusion blow molding applications.

The present invention avoids these problems through the incorporation of particular chain branching agents and chain stopping agents. Both the incorporation of the chain branching agent and solid state polymerization are believed to increase the molecular weight of the solid-state polymerized PET polymer and broaden the molecular weight distribution thereof.

Chain branching agents suitable for use in the present invention include one or more members selected from pentaerythritol; compounds having the formula:

wherein $R^1$ is a saturated aliphatic hydrocarbon radical containing from 3 to 6 carbon atoms and k is an integer from 3 to 6; compounds having the formula:

wherein $R^2$ is a saturated aliphatic hydrocarbon radical containing from 1 to 6 carbon atoms and wherein l is an integer from 3 to 6; compounds having the formula:

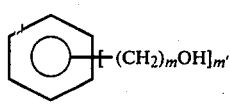

wherein m is an integer from 1 to 6 and m' is an integer from 3 to 6; and compounds having the formula:

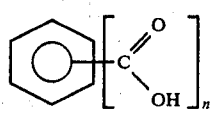

wherein n is an integer from 3 to 4.

These chain branching agents may be formed in a variety of ways which are well known to those skilled in this art.

As indicated above, the chain branching agent incorporated in the present invention may be pentaerythritol. The branching agent may also be selected from compounds having the formula:

wherein $R^1$ is a saturated aliphatic hydrocarbon radical containing from 3 to 6 carbon atoms and k is an integer from 3 to 6. Examples of such compounds include glycerol, sorbitol and hexane triol-1,2,6.

Also acceptable as branching agents are compounds having the formula:

wherein $R^2$ is a saturated aliphatic hydrocarbon radical containing from 1 to 6 carbon atoms and wherein l is an integer from 1 to 6. Examples of these compounds include trimethylolethane, trimethylolpropane and like compounds up to trimethylolhexane.

Another group of compounds which may serve as the chain branching agent used in the present invention are those having the formula:

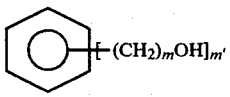

wherein m is an integer from 1 to 6 and m' is an integer from 3 to 6. Examples of such compounds include trimethylol benzene-1,3,5; tripropylol benzene-1,3,5; tributylol benzene-1,3,5; and similar compounds.

Finally, compounds having the formula:

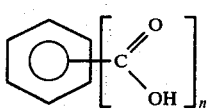

wherein n is an integer from 3 to 4 may serve as the chain branching agent used in the present invention. Examples of these compounds include trimesic acid, trimellitic acid, pyromellitic acid and prehnitic acid (1,2,3,4-benzene tetracarboxylic acid).

As previously indicated, the chain branching agent may be employed in the present invention in amounts ranging from about 0.025 to about 1.5 mol percent, and preferably in amounts ranging from about 0.05 to about 1.0 mol percent. The term "mol percent" as used herein is the number of moles of chain branching agent over the number of moles of terephthalic acid present in the starting material expressed in percent.

Particularly preferred chain branching agents include pentaerythritol and trimethylolpropane.

The presence of a chain branching agent alone is insufficient for the purposes of this invention. In the absence of a chain terminating agent the degree of polymerization achieved during solid state polymerization may reach a level exceeding the critical gel point as defined by Flory. (P. J. Flory, "Principles of Polymer Chemistry", p. 350 ff., University Press, 1953, which is herein incorporated by reference). When this occurs, gel particles are formed which mar the appearance of a formed article. The polymer of the present invention is thus "gel-free", i.e., there are substantially no gels present in the polymer.

Chain terminating agents suitable for use in the present invention must have a boiling point of above about 200° C. and must also be stable at temperatures of up to about 305° C., to avoid excessive losses at operating temperatures. A compound which is considered "stable" at temperatures of up to about 305° C. is one which undergoes no significant decomposition including decarboxylation at that temperature. Preferably, the chain terminating agents suitable for the present invention have boiling points of above about 240° C.

Chain terminating agents suitable for use in the present invention include one or more members selected from aromatic monocarboxylic acids having the formula:

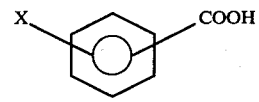

wherein X is a member selected from the group consisting of hydrogen, an aliphatic radical containing from 1 to 10 carbon atoms, an alkoxy group containing from 1 to 10 carbon atoms, an aryloxy group containing from 1 to 10 carbon atoms, a halogen, and a nitro group; heterocyclic aromatic monocarboxylic acids; fused polycyclic aromatic monocarboxylic acids; aryl aliphatic monocarboxylic acids having the formula:

where p is an integer from 1 to 3; substituted and unsubstituted, saturated and unsaturated, aliphatic monocarboxylic acids having from 6 to 30 carbon atoms; substituted and unsubstituted alicyclic carboxylic acids having from 6 to 30 carbon atoms; monofunctional esters having the formula:

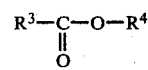

where R³ is an organic radical derived from a member selected from the group consisting of aromatic monocarboxylic acids having the formula:

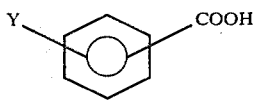

wherein Y is a member selected from the group consisting of hydrogen, an aliphatic radical containing from 1 to 10 carbon atoms, an alkoxy group containing from 1 to 10 carbon atoms, an aryloxy group containing from 1 to 10 carbon atoms, a halogen, and a nitro group; heterocyclic aromatic monocarboxylic acids; fused polycyclic aromatic monocarboxylic acids; aryl aliphatic monocarboxylic acids having the formula:

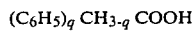

(C₆H₅)$_q$ CH$_{3-q}$ COOH where q is an integer from 1 to 3; substituted and unsubstituted, saturated and unsaturated aliphatic monocarboxylic acids having from 6 to 30 carbon atoms; and substituted and unsubstituted alicyclic carboxylic acids having from 6 to 30 carbon atoms; and wherein R⁴ is a member selected from the group consisting of benzyl radicals and aliphatic radicals having from 1 to 18 carbon atoms; and which are the reaction product of an alcohol and a monocarboxylic acid; and difunctional esters having the formula:

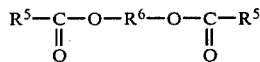

wherein R⁵ is an organic radical derived from a member selected from the group consisting of aromatic monocarboxylic acids having the formula:

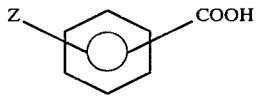

wherein Z is a member selected from the group consisting of hydrogen, an aliphatic radical containing from 1 to 10 carbon atoms, an alkoxy group containing from 1 to 10 carbon atoms, an aryloxy group containing from 1 to 10 carbon atoms, a halogen, and a nitro group; heterocyclic aromatic monocarboxylic acids; fused polycyclic aromatic monocarboxylic acids; aryl aliphatic monocarboxylic acids having the formula:

(C₆H₅)$_r$ CH$_{3-r}$ COOH where r is an integer from 1 to 3; substituted and unsubstituted, saturated and unsaturated aliphatic monocarboxylic acids having from 1 to 30 carbon atoms; and substituted and unsubstituted alicyclic carboxylic acids having from 6 to 30 carbon atoms; and wherein R⁶ is a member selected from the group consisting of saturated aliphatic radicals having from 2 to 18 carbon atoms and saturated alicyclic radicals having from 5 to 18 carbon atoms; and which are the reaction product of a diol and a monocarboxylic acid.

These chain terminating agents may be formed in a variety of ways which are well known to those skilled in this art.

As indicated above, the chain terminating agents incorporated in the present invention may be aromatic monocarboxylic acids having the formula:

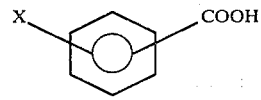

wherein X is a member selected from the group consisting of hydrogen, an aliphatic radical containing from 1 to 10 carbon atoms, an alkoxy group containing from 1 to 10 carbon atoms, an aryloxy group containing from 1 to 10 carbon atoms, a halogen, and a nitro group. Substitution may be in either one or all of the 3, 4 and 5 positions. Substition in the 2 or 6 positions may be only in either of these two positions, and is limited to aliphatic radicals containing up to two carbon atoms or methoxy or ethoxy groups. Halogen and nitrogen substitution are also acceptable. The appended claims are meant to include these limitations with respect to acceptable substitution.

The chain terminating agent may also be a heterocyclic aromatic monocarboxylic acid. Examples of such acids include β-furoic acid and coumarullic acid.

Fused polycyclic aromatic monocarboxylic acids are acceptable as chain terminating agents. Examples of such acids include, e.g., those of the formulae:

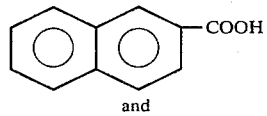

and

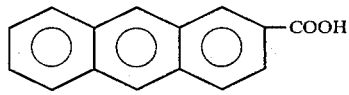

Aryl aliphatic monocarboxylic acids such as phenylacetic and diphenylacetic acid are also acceptable.

Substituted and unsubstituted, saturated and unsaturated aliphatic monocarboxylic acids having from 6 to 30 carbon atoms may also be incorporated as the chain terminating agents of the present invention. Examples of such acids include caproic, heptylic, caprylic, pelargonic, capric, lauric, myristic, stearic and palmitic acids. Unsaturated acids include those such as oleic, linoleic and linolenic acids. Lower homologues with proper substitution which result in a sufficiently high boiling point, i.e., above about 200° C., are also contemplated.

Further contemplated are substituted and unsubstituted alicyclic carboxylic acids having from 6 to 30 atoms such as cyclohexane carboxylic acid, cyclopentane carboxylic acid and 2-Decalin ® carboxylic acid. Decalin ® is a registered trademark of E. I. duPont de Nemours & Co. for decahydronaphthalene.

Monoesters contemplated for incorporation as chain terminating agents include, e.g., benzyl benzoate, benzyl stearate, benzyl diphenyl acetate, ethylene glycol monobenzoate and ethylene glycol monostearate. Diesters include, e.g., ethylene glycol distearate and ethylene glycol dibenzoate. The diesters are esters of diols and not dicarboxylic acids. The acid constituents of the esters need not be limited to those previously mentioned chain terminating agents. The only criteria for selecting these constituents are that the boiling points be above about 200° C. preferably above about 240° C. and that the esters be stable at temperatures up to about 305° C.

The amount of chain terminating agent used is based on the number of equivalents of hydroxyl groups present in the particular amount of chain branching agent used. For example, 0.1 mole of trimethylolpropane contains 0.3 equivalents of hydroxyl groups. Generally, the amount of chain terminating agent used ranges from about 0.25 to about 10 equivalents based on the number of moles of chain branching agent used. Preferably, the amount ranges from 0.50 to about 5 equivalents on this basis. Preferred chain terminating agents include benzoic and stearic acids.

In another embodiment of the present invention, a single compound is used which acts both as a chain branching agent and a chain terminating agent. This compound is a polyfunctional ester having the formula:

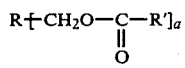

wherein a is an integer from 3 to 6. The polyfunctional ester has a boiling point of above about 200° C., preferably above about 240° C., is stable at temperatures of up to about 305° C., and may be made by a variety of methods well known to those skilled in this art. The ester is used in amounts from about 0.025 to about 1.5 mol percent, preferably from about 0.05 to 1.0 mol percent. The alcohol portion of the ester may include any of the alcohol chain branching agents previously discussed above. The acid moiety would include those acids defined above as acceptable chain terminating agents, as well as lower boiling (i.e., with a boiling point of about 200° C. or less) acids such as, e.g. formic acid, acetic acid, propionic acid, butyric acid, isobutyric acid, valeric acid and isovaleric acid, or other lower boiling aromatic or alicyclic acids.

In some instances, the polyfunctional ester can only supply a maximum of one equivalent of chain terminating agent. In these instances, additional quantities of other chain terminating agents selected from those defined above may be used in amounts ranging from 0.1 to 5 equivalents based on the number of hydroxyl groups present in the particular amount of polyfunctional ester used. Preferred polyfunctional esters are trimethylolpropane tribenzoate and pentaerythritol tetrastearate.

In addition, mixtures of polyfunctional esters and polyfunctional alcohols as well as monocarboxylic acids can be used together in particular situations.

The chain branching agent and chain terminating agent or single compound acting as both are incorporated with a starting material which is selected from the group consisting of a terephthalic acid (TA) "monomer" (an oligomer of terephthalic acid and ethylene glycol) and bishydroxyethylterephthalate (BHET).

These starting materials may be made by a variety of ways known to those skilled in this art. For example, the TA "monomer" may be prepared, e.g., by reacting terephthalic acid and ethylene glycol (mol ratio=1:2) with choline (about 500–700 parts per million based on the weight of the terephthalic acid) at a temperature of about 265° C. and under 50 psi nitrogen. Ethylene glycol and water are collected until an oligomeric material (the TA "monomer") remains in the reaction vessel. BHET is a diester of terephthalic acid and ethylene glycol and may be prepared, e.g., by the reaction of terephthalic acid and ethylene oxide (mol ratio=1:2.5) at a temperature of about 160° C., as a 10% solution in benzene in a Parr Bomb for about 3 hours.

These materials are incorporated to form a prepolymer blend, which is heated, e.g., in an oil bath, to a temperature of about 180° C.

Into the heated prepolymer blend is incorporated any standard PET catalyst which does not interfere with the function of the chain branching and terminating agents. These catalysts are well known to those skilled in the art and include, e.g., antimony trioxide and antimony pentoxide. They may be incorporated in catalytically effective amounts, e.g., from about 300 ppm to about 1000 ppm based on the weight of polymer made.

The temperature of the once-modified prepolymer blend is increased to from about 200° C. to about 220° C. and the blend is again modified by the incorporation of a thermal stabilizing agent. Examples of such stabilizing agents include, e.g., polyphosphoric acid, triphenyl phosphite and trimethyl phosphite. The stabilizers may be incorporated in an amount effective to stabilize the prepolymer blend, e.g., ranging from about 25 to about 50 parts phosphorus per million parts polymer in the final product.

The chain branching and chain terminating agents may be conveniently incorporated, e.g., as ethylene glycol slurries. This method of incorporation is also convenient for the PET catalysts and thermal stabilizing agents.

After incorporation of the stabilizing agent, the temperature of the blend is increased to from about 260° C. to about 270° C., and a vacuum is applied to lower the pressure on the blend to less than about one millimeter of mercury over a period of less than about one hour. Preferably, the pressure is lowered to less than about 0.5 millimeters of mercury.

After achieving the necessary vacuum, the temperature of the blend is increased to from about 280° C. to about 290° C., and maintained at that temperature under vacuum for a period of at least about one hour, and more generally for a period of about one to about three hours, depending on the nature and amount of additives incorporated therein.

Subsequently, the prepolymer blend is either extruded into a quenching medium to form an amorphous strand of solid prepolymer or allowed to cool in situ to a temperature of about 25° C. to form a crystalline solid prepolymer mass. If extruded, the amorphous strand is cut into a plurality of amorphous prepolymer pellets which are slowly heated over a period of at least one hour to a temperature of above the glass transition temperature ($T_g$ is equal to about 70° C. to 80° C.), preferably to a temperature of about 120° C., until the pellets are crystallized. An appropriate pellet size would be, e.g., a cylinder of about 1/16" in length and 1/32" in diameter.

Where the prepolymer mass is allowed to cool and solidify in situ, the solidified mass is subsequently milled to an appropriate size. E.g., the solidified mass may be pulverized in an Abbe Mill through a 0.25 in. hole screen. The material is sieved through a 9 mesh screen to remove fines. In either situation, sieving of the prepolymer particles to eliminate fines aids in the subsequent solid state polymerization step.

The final prepolymer has an inherent viscosity (I.V.) of from about 0.3 to about 1.0. After the PET prepolymer has been formed and pelletized or milled, the prepolymer particles are subjected to solid-state polymerization to form a high melt-strength, gel-free, branched PET polymer suitable for extrusion blow molding applications. The PET polymer is extremely shear sensitive, having a zero shear rate melt viscosity of from about $10^5$ to about $10^6$ at a temperature of from about 265° C. to about 300° C. poise and a melt viscosity at a shear rate of about $10^3$ seconds$^{-1}$ and at a temperature of from about 265° C. to about 300° C. of from about $10^3$ to about $10^4$ poise. The PET polymer has an I.V. of above about 1.0 and greater than the I.V. of the prepolymer.

The PET prepolymer particles are solid-state polymerized by heating, e.g., in an oil bath, to a temperature of from about 185° C. to about 250° C., and preferably to about 220° C., over a period of at least about one hour. The particles are solid-state polymerized under a vacuum of below about 0.5 millimeters of mercury, preferably from about 0.2 to about 0.5 millimeters of mercury, and down to as low as about 0.01 millimeters of mercury. The solid-state polymerization may be aided by constant or intermittent agitation, e.g., by tumbling or by the use of a sparge gas. The reaction may be carried out in an inert gas atmosphere.

Once heated, the prepolymer particles are maintained at the desired temperature and pressure for a period of at least about one hour. This period may extend for up to thirty or more hours, depending on the size of the prepolymer particles or chips. Polymerization is terminated when the desired I.V. (i.e., an I.V. of above about 1.0) is attained. This may vary, higher final I.V.'s being required for larger containers or bottles. Excessive contact of the polymer with oxygen or air during the solid-state polymerization process should be avoided, as such contact tends to degrade the polymer.

The modified and improved PET polymers of the present invention may be extrusion blow molded on conventional extrusion blow molding equipment which is common in the container fabrication industry. Generally, blow molding machines comprise an extruder having a die gap at one end thereof and an openable mold positioned adjacent the die gap. The polymer is extruded through the die gap to form a parison, and the mold is closed about the parison. A gas is then introduced into the parison to expand it into the shape of the internal surface of the mold. Preferably, a blow pin is inserted into the parison and air is blown into the parison to cause it to expand and conform with the shape of the internal mold surface.

The extrusion blow molding process may be either continuous or intermittent. In the continuous system, a typical operation is as follows: The PET polymer is fed to a hopper/dryer, and subsequently passed by way of a heated screw-type extruder to the die gap. Multiple sets of alternating die pairs close on parisons, which are formed at a rate of one about every ten seconds, and the desired containers are then blow molded to shape. Examples of end-use applications for the continuous process include the formation of shampoo and mouthwash bottles.

In the intermittent process, the extruder screw both rotates and translates, and a parison is formed in a period of about one second.

Temperatures in the heated screw extruder range from about 270° C. to about 305° C. Shear rates in the extruder for both the continuous and intermittent processes reach a maximum of about 1000 seconds$^{-1}$. In the die, the maximum shear rates for the continuous process are about 500 seconds$^{-1}$, and up to about 50,000 seconds$^{-1}$ in the intermittent process.

The extrusion blow molding materials of the present invention may contain minor amounts of additional materials, such as fillers and plasticizers, so long as these additional materials do not detrimentally affect the physical properties of the extrusion blow molding materials.

The present invention is further illustrated by the following examples.

EXAMPLE I

A polyethylene terephthalate prepolymer was prepared substantially in accordance with the procedure discussed hereinabove. About 0.3 weight percent of a chain branching agent consisting of trimethylolpropane (about 1.5 grams in 500 grams of TA "monomer") and about 1.6 equivalents of a chain terminating agent consisting of benzoic acid (6.55 grams) were incorporated into 500 grams of TA "monomer". About 0.15 grams of an antimony trioxide catalyst was employed, and was added as an ethylene glycol slurry. About 10 ml. of a polyphosphoric acid stabilizer solution was also employed. The stabilizer solution was taken from a bulk solution made with about 0.2 grams polyphosphoric acid in about 50 ml. of ethylene glycol. After processing for a period of over 2 hours, the prepolymer had an I.V. of 0.96 (equal volume parts of trifluoroacetic acid and methylene chloride, 0.2 weight percent, 25° C.).

Once obtained, the prepolymer was solid-state polymerized in a manner substantially in accordance with the procedure discussed hereinabove. The solid-state polymerization was performed at a temperature of about 220° C. under a vacuum of about 0.05 millimeters of mercury for a period of about 3 hours. The PET polymer obtained had a melt strength of about 1.34 and an IV of about 1.63. The PET polymer can be successfully processed to form a hollow container by conventional extrusion blow molding techniques using existing, conventional, extrusion blow molding equipment.

COMPARATIVE EXAMPLE A

A polyethylene terephthalate prepolymer was prepared substantially in accordance with the procedure discussed hereinabove. About 0.3 weight percent of a chain branching agent consisting of trimethylolpropane (about 1.5 grams in 500 grams of TA "monomer") was used. No benzoic acid chain terminating agent was incorporated in this run. Again, 500 grams of TA "monomer" was used as the starting material. About 0.15 grams of an antimony trioxide catalyst was employed, and was added as an ethylene glycol slurry. About 10 ml. of a polyphosphoric acid stabilizer solution was also employed. The stabilizer solution was taken from a bulk solution made with about 0.2 grams polyphosphoric acid in about 50 ml. of ethylene glycol. After processing for a period of about 1.5 hours, the prepolymer had an I.V. of 0.91 (equal volume parts of trifluoroacetic acid and methylene chloride, 0.2 weight percent, 25° C.).

Once obtained, the prepolymer was solid-state polymerized in a manner substantially in accordance with the procedure discussed hereinabove. The solid-state polymerization was performed at a temperature of about 220° C. under a vacuum of about 0.05 millimeters of mercury for a period of about 3 hours. The PET polymer obtained had a melt strength of about 1.2. An I.V. could not be determined due to the presence of an excessive amount of gels. The PET polymer cannot be successfully processed to form a hollow container by conventional extrusion blow molding techniques using existing, conventional, extrusion blow molding equipment.

EXAMPLE II

A polyethylene terephthalate prepolymer was prepared substantially in accordance with the procedure discussed hereinabove. About 0.1 weight percent of a chain branching agent consisting of pentaerythritol (about 0.5 grams in 500 grams of TA "monomer") and about 2.0 equivalents of stearic acid (about 8.36 grams) were incorporated into 500 grams of TA "monomer." About 0.15 grams of an antimony trioxide catalyst was employed, and was added as an ethylene glycol slurry. About 10 ml. of a polyphosphoric acid stabilizer solution was also employed. The stabilizer solution was taken from a bulk solution made with about 0.2 grams polyphosphoric acid in about 50 ml. of ethylene glycol. After processing for a period of over 2.5 hours, the prepolymer had an I.V. of 1.01 (equal volume parts of trifluoroacetic acid and methylene chloride, 0.2 weight percent, 25° C.).

Once obtained, the prepolymer was solid-state polymerized in a manner substantially in accordance with the procedure discussed hereinabove. The solid-state polymerization was performed at a temperature for about 220° C. under a vacuum of 2.5 hours. The PET polymer obtained had an I.V. of about 1.33. The PET polymer can be successfully processed to form a hollow container by conventional extrusion blow molding techniques using existing, conventional, extrusion blow molding equipment.

COMPARATIVE EXAMPLE B

A polyethylene terephthalate prepolymer was prepared substantially in accordance with the procedure discussed hereinabove. About 0.1 weight percent of a chain branching agent consisting of pentaerythritol (about 0.5 grams in 500 grams of TA "monomer") was incorporated. A catalyst and stabilizer were employed in the same manner as in Example I. No stearic acid chain terminating agent was incorporated in this run. Again, 500 grams of TA "monomer" was used as the starting material. After processing for a period of about two hours, the prepolymer had an I.V. of about 0.96 (equal volume parts of trifluoroacetic acid and methylene chloride, 0.2 weight percent, 25° C.).

Once obtained, the prepolymer was solid-state polymerized in a manner substantially in accordance with the procedure discussed hereinabove. The solid-state polymerization was performed at a temperature of about 220° C. under a vacuum of about 0.02-0.05 millimeters of mercury for a period of about 2.5 hours. An I.V. for the PET polymer could not be determined due to the presence of an excessive amount of gels. The PET polymer cannot be successfully processed to form a hollow container by conventional extrusion blow molding techniques using existing, conventional, extrusion blow molding equipment.

COMPARATIVE EXAMPLE C

A polyethylene terephthalate prepolymer was prepared substantially in accordance with the procedure discussed hereinabove. About 0.3 weight percent of a chain branching agent consisting of trimethylolpropane (about 1.5 grams in 500 grams of TA "monomer") and about 27.6 grams of a chain terminating agent consisting of poly(ethylene glycol monocetyl ether) (molecular weight of about 1000) were incorporated into 500 grams of TA "monomer." A stabilizer and catalyst were employed in the same manner as in Example I.

Approximately one hour after maximum vacuum was obtained (0.5 millimeters of mercury), heavy gassing took place indicating a substantial amount of decomposition of the ethylene glycol monocetyl ether. Thus, such a combination of chain branching agent and chain terminating agent would be totally unsuitable for the purposes of the present invention. The amount of chain terminating agent used corresponds to about 0.825 equivalents of chain terminating agent.

EXAMPLE III

A TA "monomer" was prepared in situ. The TA "monomer" was prepared by charging terephthalic acid (about 173 pounds), ethylene glycol (about 129.2 pounds) and choline (45 weight percent solution in ethylene glycol [about 10.89 grams]) to a reaction vessel. The temperature (Dowtherm) was about 265° C. About 50 psi of nitrogen was placed over the vessel. The reaction mixture was agitated. After about 30 minutes, distillation of water and ethylene glycol began, and after the necessary amounts of water and ethylene glycol had been removed, the agitation speed was reduced. About 298.8 grams of trimethylolpropane was introduced as an ethylene glycol slurry. Approximately five minutes after introduction of the trimethylolpropane, about 1633 grams of benzoic acid was introduced, also as an ethylene glycol slurry. Thus, trimethylolpropane was present in an amount of about 0.38 weight percent based on the amount of terephthalic acid. Benzoic acid is present in an amount of about 2.0 equivalents of acid based on the number of moles of hydroxyl groups present in the trimethylolpropane charged. After a period of about five minutes (to allow for adequate mixing), about 36.4 grams of antimony oxide (about 400 parts per million based on the polymer) was added as an ethylene glycol slurry. This was followed by the addition of about 98 grams of a 10% solution of polyphosphoric acid in ethylene glycol. The temperature (Dowtherm) was set at about 285° C., and the vacuum was lowered to about 0.5 millimeters of mercury over a period of about 45 minutes. The reaction was allowed to proceed until the agitator pressure indicated that an I.V. of from about 0.6 to about 0.7 had been achieved. The material was extruded out under nitrogen pressure, quenched in water and subsequently dried.

Solid state polymerization was carried out after the modified polyethylene terephthalate had been heated in an air oven at a temperature of about 120° C. until crystallization occurred. The solid state polymerization was carried out in a Patterson Kelley Tubular Dryer at a temperature of about 220° C. and at a vacuum of from about 0.2 to about 0.5 millimeters of mercury for a period of about 24 hours. The modified polyethylene terephthalate had a zero shear rate melt viscosity at a temperature of about 280° C. of 190,000 poise, and a melt viscosity at a shear rate of about $10^3$ seconds$^{-1}$ of about 5500 poise, at a temperature of about 280° C.

About 100 pounds of the modified polyethylene terephthalate polymer was fed to a hopper/dryer, and subsequently passed by way of a screw-type extruder (heated to a temperature of about 280° C. to 282° C.) to a die gap. The shear rate in the extruder was about 1000 seconds$^{-1}$ in the screw flight clearance (area between the narrow portion of the screw and the wall) and also in the die gap. The formation of the parison was continuous, taking about 5.4 seconds for completion of parison formation. A plurality of molds were arranged to be individually moved into a position surrounding and clamping each parison as formed. Once in position, the mold was moved out of the parison formation area and inflated by insertion of a blow pin into the parison. Air was introduced through the blow pin into the parison, causing it to expand and conform to the inner surfaces of the mold. As this procedure progressed, a new mold moved into place in the parison formation area, surrounding and clamping the next parison to be formed. Modified polyethylene terephthalate polymer of the present invention was processed in the blow molding apparatus with a minimum of torque development. A finished, extrusion blow molded container made in accordance with this invention is a tough material having a clear, smooth appearance. It possesses a minimum of gels and a uniform wall thickness.

COMPARATIVE EXAMPLE D

A high molecular weight polyethylene terephthalate is prepared in a manner similar to that set out in Example III, except that the chain branching agent and/or chain terminating agent are not incorporated. Such a product has a zero shear rate melt viscosity of about 110,000 poise at a temperature of about 280° C., and a melt viscosity at a shear rate of about $10^3$ seconds$^{-1}$ and at a temperature of about 280° C. of about 10,000 poise. Such a material lacks the melt strength sufficient to support an adequate parison for blow molding applications, and requires extremely high processing temperatures (greater than 300° C.), with the extrusion blow molding machine operating very near to or in excess of the extruder torque limit.

EXAMPLE IV

A polyethylene terephthalate prepolymer was prepared substantially in accordance with the procedure discussed above in Example III. The trimethylolpropane chain branching agent and benzoic acid chain stopping agent were substituted for with about 656.3 grams of pentaerythritol tetrastearate. The prepolymer had an inherent viscosity of about 0.7 (0.2 weight percent in o-chlorophenol at 25° C.). Solid state polymerization was carried out after the modified polyethylene terephthalate had been heated in an air oven to a temperature of about 125° C. for several hours in order to crystallize the modified polyethylene terephthalate.

The material was placed in a Patterson-Kelley Tubular Vacuum Dryer and heated to a temperature of from about 175° C. to about 190° C. for about three hours to obtain additional crystallization. (Such additional crystallization avoids the tendency of the polymer to stick to the walls of the Tubular Vacuum Dryer). Solid state polymerization was then carried out for a period of about twelve hours at a temperature of from about 205° C. to about 216° C. under a vacuum of from about 0.3 to about 0.5 millimeters of mercury. The polyethylene terephthalate polymer had a melt strength of about 1.11 and an inherent viscosity of about 2.17 (0.2 weight percent in HFIP at 25° C.).

The modified polyethylene terephthalate polymer may be blow molded to form a container in a manner similar to that discussed above in Example III.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. A process for blow molding a modified polyethylene terephthalate polymer into containers on a blow molding machine comprising an extruder having a die gap at one end thereof and an openable mold positioned adjacent the die gap comprising: (a) extruding molten modified polyethylene terephthalate polymer through the die gap to form an unsupported parison, the modified polyethylene terephthalate polymer having a zero shear rate melt viscosity at a temperature in the range of from about 265° C. to about 300° C. of from about $10^5$ to about $10^6$ poise and a melt viscosity at a shear rate of about $10^3$ seconds$^{-1}$ and at a temperature of from about 265° C. to about 300° C. of from about $10^3$ to about $10^4$ poise; (b) closing the mold about the parison; and (c) introducing a gas into the parison to cause it to expand and conform with the shape of the internal mold surface.

2. The process according to claim 1 wherein the extrusion is carried out on a continuous basis and wherein parisons are formed at intervals of about ten seconds.

3. The process according to claim 1 wherein the extrusion is carried out on an intermittant basis and wherein parisons are formed at intervals of about one second.

* * * * *